United States Patent
Oshins et al.

[11] Patent Number: 5,379,485
[45] Date of Patent: Jan. 10, 1995

[54] FLEXIBLE SHEETING WITH CASTERS

[76] Inventors: Ellen Oshins; Mary L. Impellizeri, both of 3 Sheridan Sq. - Apt. 2H, New York, N.Y. 10014

[21] Appl. No.: 97,708
[22] Filed: Jul. 27, 1993
[51] Int. Cl.⁶ .................................. B60B 33/08
[52] U.S. Cl. ........................................ 16/24
[58] Field of Search ............... 16/24, 25, 26, 21, 18 R

[56] References Cited

U.S. PATENT DOCUMENTS

| | | | |
|---|---|---|---|
| 356,483 | 1/1887 | Loos | 16/24 |
| 449,966 | 4/1891 | Simonds | 16/24 |
| 665,219 | 1/1901 | Hock | 16/24 |
| 1,279,048 | 9/1918 | Waskiewicz | 16/24 |
| 1,383,396 | 7/1921 | Friend | 16/24 |
| 2,033,510 | 3/1936 | Brayley | 16/24 |
| 3,285,447 | 11/1966 | Junion | 16/24 |
| 3,559,802 | 2/1971 | Eidus | 16/18 |
| 3,893,700 | 7/1975 | Dunmyer | 16/24 |

FOREIGN PATENT DOCUMENTS 0104402 6/1982 Japan ........................... 16/24

Primary Examiner—P. Austin Bradley
Assistant Examiner—Chuck Y. Mah
Attorney, Agent, or Firm—Levine & Mandelbaum

[57] ABSTRACT

A flexible base web, which can be supplied from a roll, has casters distributed over one of its surfaces. The base web can be spooled and segments shorter than the overall length can be cut from the base web and affixed to heavy objects for allowing them to be rolled along a floor with lifting.

8 Claims, 2 Drawing Sheets

FLEXIBLE SHEETING WITH CASTERS

BACKGROUND OF THE INVENTION

This invention pertains to the use of casters for moving heavy objects. More specifically, the invention relates to the provision of a flexible sheet material having casters distributed over its surface for attachment to objects of various sizes and shapes in order to enable them to be moved along the ground.

It is known in the art to employ casters in the form of wheels, balls, or other cylindrical or spherical rollers. Such casters or rollers are usually components of assemblies including rigid, and relatively heavy, platforms, with or without handle assemblies, such as hand trucks and dollies. These devices are generally large, heavy, cumbersome, and expensive. Also, once purchased, their used is generally limited to objects within a narrow range of sizes.

It is desirable to be able to employ inexpensive casters on objects of virtually any size or shape, for permanent or temporary use.

It is known in the art to provide casters along rows and columns in a sheet of a rigid material that is scored to make the sheet frangible between the rows and columns. This enables portions of the material, each containing a caster, to be broken off for use, whereby one or more individual casters may be attached to an object for enabling it to be moved along a floor. Such a construction is disclosed in U.S. Pat. No. 3,559,802 to Eidus for a Caster Assembly.

The use of rigid sheets as disclosed by Eidus limits their usefulness on non-planar surfaces and makes the sheets difficult to store when suitably sized to support large objects. In addition, such sheets can be wasteful when only a portion of one sheet is to be used and the remainder is of a size too small to have immediate utility.

SUMMARY OF THE INVENTION

The aforementioned problems of the prior art are overcome by the instant invention which provides for a web of flexible sheeting material having, distributed over its surface, spaced spherical bearings for attachment to the surface of an object to enable it to be moved by rolling along a floor. More specifically, the invention includes a web of flexible material, the web having a plurality of apertures, casters mounted on the web at each of the apertures, each caster including a housing having a cavity and a ball snugly disposed within the cavity, each ball being freely rotatable within the cavity but restricted from translational movement a portion of the circumference of each ball protruding through a respective one of the web apertures from one surface of the web, a retainer mounted on each housing, over its respective ball, the retainer having an aperture with a diameter less than the maximum diameter of the ball for keeping the ball within the housing, with a portion of the circumference of the ball protruding through the retainer aperture. The caster assembly may be fastened to the web of flexible material or embedded within it. The web may have a channel open at one surface and containing a plurality of the balls, a portion of the circumference of each of the balls protruding through the web opening, the width of the opening at the surface being less than the diameters of the balls for keeping the balls within the channel.

It is therefore an object of the invention to provide an apparatus for moving heavy articles which is aesthetically attractive, light in weight, useful irrespective of the size of the article, and inexpensive.

Another object of the invention is to provide an apparatus for moving heavy articles which is flexible.

Still another object of the invention is to provide an apparatus for moving heavy articles which can be dispensed from a spool.

A further object of the invention is to provide an apparatus for moving heavy articles which can be wrapped about several or all of the surfaces of the article.

Other and further objects of the invention will be apparent from the following drawings and description of a preferred embodiment of the invention in which like reference numerals are used to indicate like parts in the various views.

DESCRIPTION OF THE PREFERRED EMBODIMENTS

Figure 1:
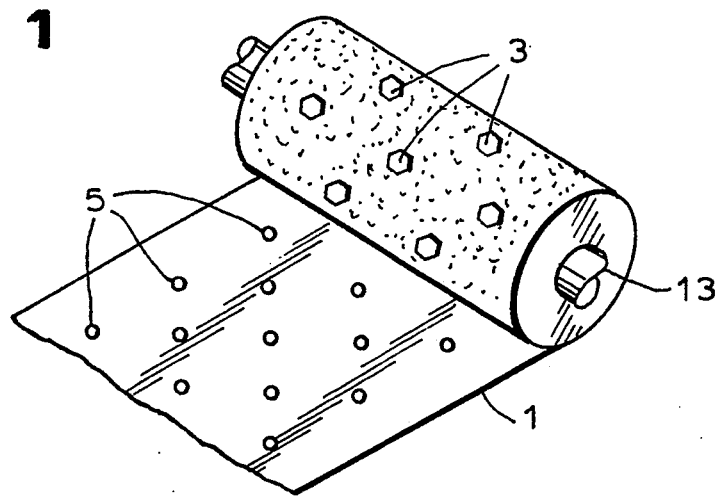
FIG. 1 is a perspective view of a first preferred embodiment of the invention.

Referring now to FIG. 1 of the drawings, there is shown a base web 1 of a sheet-like material which can be a cloth woven from natural fibers, e.g., cotton or wool or from synthetics, e.g., nylon, rayon, polyester, or a blend of any of the foregoing. Other well known fibers used in fabricating cloths can also be used and will be known to those skilled in the art.

Figure 2:
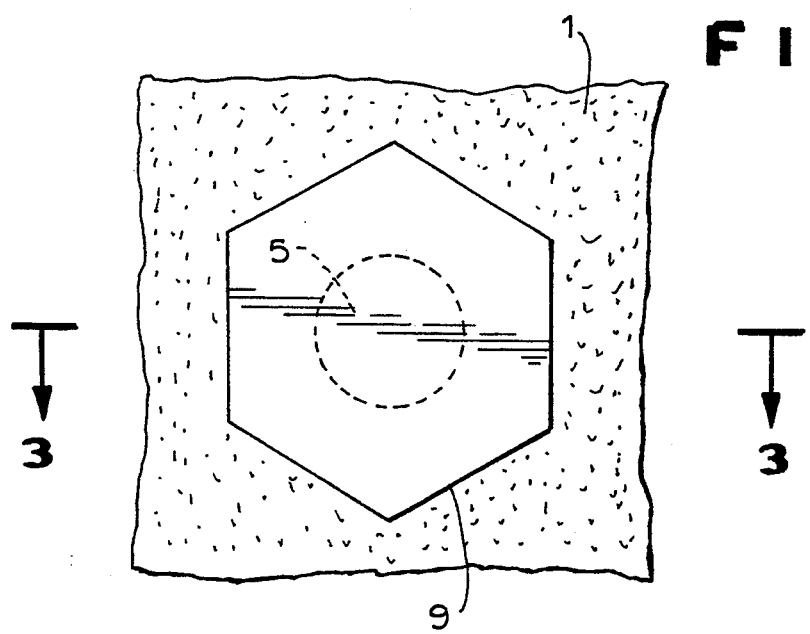
FIG. 2 is a fragmented plan view of the first preferred embodiment of the invention illustrated in FIG. 1.
Figure 3:
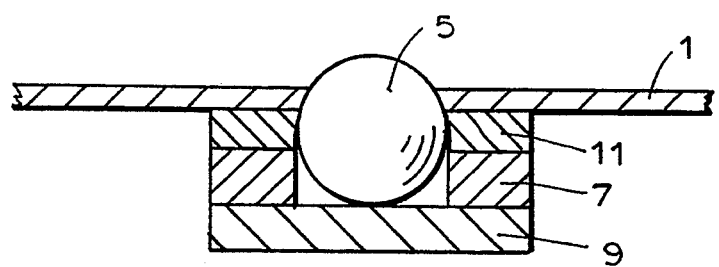
FIG. 3 is a sectional elevation view taken through line 3—3 of FIG. 2.

Protruding from one surface of the base web 1, and distributed over its surface are ball bearing caster assemblies 3. Referring now to FIGS. 2 and 3, each of the caster assemblies 3 mounted on the base web 1 includes a ball 5 disposed within the cylindrical bore of a housing 7 which, in the embodiment of FIGS. 1-3, has a hexagonal cross-section.

One end of the cylindrical bore of each housing 7 is enclosed by a cap 9. Mounted over the ball 5 at the opposite end of the cylinder 7 is a retaining ring 11. The diameter of the cylindrical bore of the housing 7 is slightly greater than the outer diameter of the ball 5 to enable the ball 5 to rotate freely within the housing 7.

The retaining ring 11 has an aperture of diameter slightly smaller than the diameter of the ball 5 so that the retaining ring 11 keeps the ball 5 within the housing 7 while permitting it to be freely rotatable. The housing 7, cap 9, and retaining ring 11 are preferably formed from rigid materials which are capable of having smooth interior bearing surfaces imparted to them, such as metals, or relatively hard plastics.

The ball 5 may also be made of metal or plastic. Hardness and smoothness of the materials employed in fabricating the ball 5, and the socket formed from the housing 7, cap 9 and retaining ring 11, enhance the function of the caster of the invention and appropriate materials will be known to those skilled in the art.

The housing 7 and cap 9 may be formed from a molded blind cylinder. The cap 9 may be affixed to the housing 7 through the use of a suitable adhesive or welding process. The retaining ring 11 is preferably affixed to the housing 7 after the ball 5 is inserted in its cylindrical bore, by application of a cement to the mating surfaces of the housing 7 and retaining ring 11 or by welding along the seam between them. The retaining ring 11 is preferably affixed to base web 1 by use of a cement having an affinity for the material from which the retaining ring 11 is formed and for the fabric or other flexible sheet material from which the base web 1 is formed.

In the embodiment of FIGS. 1–3, the web of sheeting material 1 is provided with circular apertures preferably uniformly spaced over its surface. Into each of the apertures, there is inserted the exposed end surface of a ball 5 of a caster assembly so that the exposed surface protrudes through the aperture in the base web 1 beyond its opposite surface. The protruding ball surfaces form the bearing surface for the base web 1 which engages the floor when an object is to be moved as will be explained subsequently.

Referring to FIG. 1, the base web 1 can be wound on a spool 13 to enable lengths of the flexible sheet with casters to be withdrawn from the wound spool in lengths commensurate with the size of an object to be moved.

Figure 4:
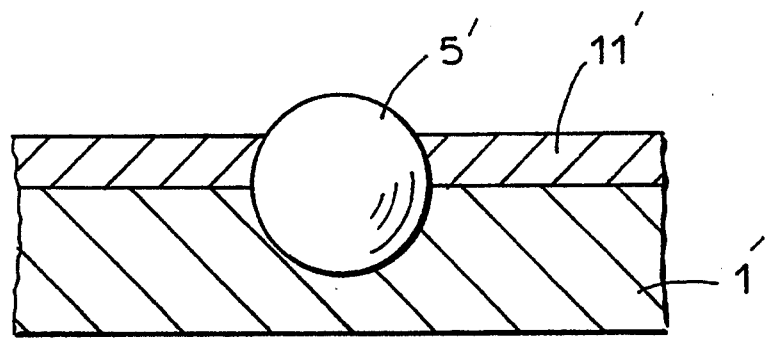
FIG. 4 is a sectional elevation view of a second preferred embodiment of the invention.

Referring now to FIG. 4 of the drawings there is shown a second embodiment of the invention. In the embodiment of FIG. 4, a base web 1' is formed from a flexible, relatively incompressible, sheeting material e.g., polyvinyl chloride, polyethylene, polypropylene or other similar material. Semi-spherical cavities having diameters less than the thickness of the base web 1' are formed in one of its surfaces, each to receive a ball 5'.

The ball 5' has a diameter just slightly less than the diameter of the cavity in which it is received to enable it to be freely rotatable but limiting translational movement of the ball within the cavity.

A retainer web 11' has apertures which are tapered. The retainer web 11' is joined to the base web 1' by welding or use of an adhesive, with each of the apertures in the retainer web 11' aligned with a ball 5'. The diameter of each aperture in the retainer web 11' at the surface of the retainer web 11' that forms an interface with the base web 1' is larger than the aperture diameter at the opposite side of the retainer web 11'. The diameters of the tapered apertures in the retainer web 11', at the surface opposite the interface with the base web 1' are small enough to prevent each ball 5' from passing therethrough, each ball 5' being entrapped within the cavity in the base web 1', freely rotatable therein, and prevented from experience translational movement, with a portion of the ball surface protruding beyond the surface of retainer web 11' opposite the interface with the base web 1' for serving as a rotatable bearing surface.

The compound web formed from the webs 1' and 11' can be spooled for dispensing in continuously variable lengths, as needed. The flexibility of the compound web enables it to be affixed to both planar and non-planar surfaces of objects which are to be rolled along the ground.

The degree of flexibility of the compound web is a function of the thickness of the webs 1' and 11' which are in turn dependent on the diameter of the ball 5'. The embodiment of FIG. 4 is suitable for surfaces which are either planar or non-planar with irregularities less abrupt than those to which the embodiment of FIG. 1 may be better suited. The embodiment of FIG. 4 may have the potential for providing greater tensile strength and shearing resistance than that of FIG. 1, with reduced flexibility owing to the thicker base web, depending on the choice of materials.

Figure 5:
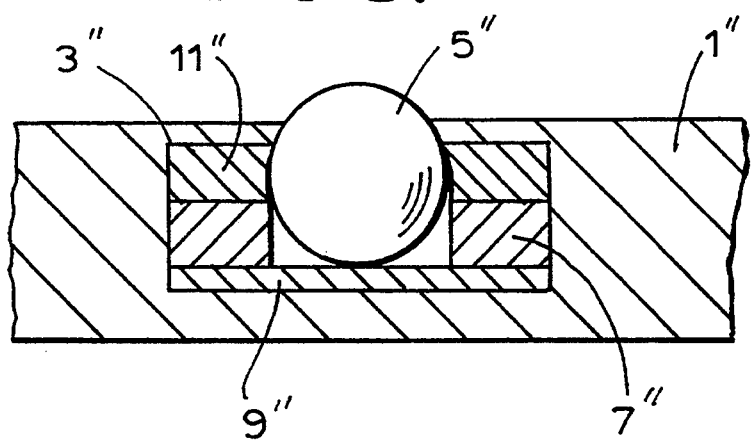
FIG. 5 is a sectional elevation view of a third preferred embodiment of the invention.

Referring now to FIG. 5 of the drawings there is shown a third embodiment of the invention. As in the embodiment of FIG. 4, a base web 1" is formed from a flexible, relatively incompressible, sheeting material, e.g., polyvinyl chloride, polyethylene, polypropylene or other similar material.

Embedded within one surface of the base web 1", and protruding therefrom, are ball bearing caster assemblies 3". Each of the caster assemblies 3" mounted on the base web 1" includes a ball 5" disposed within the cylindrical bore of a housing 7".

One end of the cylindrical bore of each housing 7" is enclosed by a cap 9". Mounted over the ball 5" at the opposite end of the cylinder 7" is a retaining ring 11". The diameter of the cylindrical bore of the housing 7" is slightly greater than the outer diameter of the ball 5' to enable the ball 5" to rotate freely within the housing 7".

The retaining ring 11" has an aperture of diameter slightly smaller than the diameter of the ball 5" so that the retaining ring 11" keeps the ball 5" within the housing 7" while permitting it to be freely rotatable. As with the other embodiments, the housing 7", cap 9", and retaining ring 11" are preferably formed from rigid materials which are capable of having smooth interior bearing surfaces imparted to them, such as metals, or relatively hard plastics.

The ball 5" may also be made of a metal or plastic. Hardness and smoothness of the materials employed in fabricating the ball 5", and the socket formed from the housing 7", cap 9" and retaining ring 11" enhance the function of the caster of the invention and appropriate materials will be known to those skilled in the art.

The caster assemblies can be embedding in the web material while the web material is in a fluid state. When the web material solidifies it secures the housing 7" cap 9" and retainer ring 11" together. Alternatively the housing 7", cap 9" and retainer ring 11" can be preassembled an inserted in the web while it is in a molten state or in cavities within a solid base web.

Each caster assembly can be embedded in the base web 1" during a molding or extrusion process in which the base web 1" is formed. The caster assemblies are inserted into the web material, or the web material, while fluid, is permitted to flow about the caster assemblies with the exposed end surface of a ball 5" of each caster assembly protruding beyond the surface of the base web 1". The protruding ball surfaces form the bearing surface for the base web 1" which engages the floor when an object is to be moved.

Figure 6:
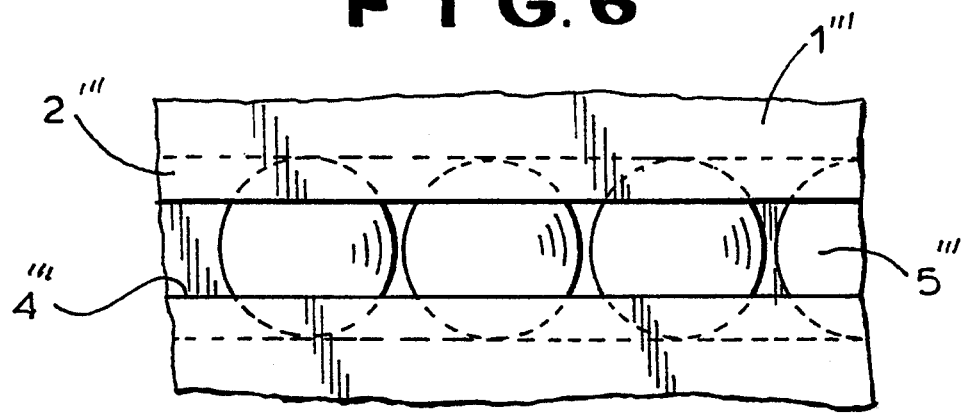
FIG. 6 is a fragmented plan view of a fourth embodiment of the invention.

Referring now to FIG. 6 of the drawings there is shown a fourth embodiment of the invention. In fabricating the embodiment of FIG. 6, a base web 1''' is extruded with parallel cylindrical channels 2''' formed therewithin. Ball bearings 5''' are inserted into each channel with their centers in alignment with the longitudinal axis of the channel 2'''. The channel 2''' is open at one surface of the base web 1''', the opening being narrower than the diameters of the ball bearings 5''' to prevent the ball bearings from coming out of the channel 2''' through the opening 4'''. Each channel 2''' is preferably filled with ball bearings along its entire length, with the base web 1''' sealed at the ends of each channel to prevent translational movement of the ball bearings 5''' while permitting them to freely rotate.

In use, the side of the base web 1''' opposite the one having a slot where the ball bearings 5''' are exposed, is attached to an object to be moved along the floor.

In the use of each of the preferred embodiments of the invention, an appropriate length of the sheeting material with caster assemblies is cut from an optionally spooled supply, and attached to one or more surfaces of an object to be moved. The material may be provided with an adhesive layer, with or without a releasible backing, for attachment to the object. Alternatively, it may be fastened to the object by stitching, tying, gluing, tacking, or in any manner of temporarily or permanently affixing a flexible sheet material to an object.

The sheet with casters can be used to cover a single planar surface of an object intended to face the ground when the object is moved, or it can be placed on a non-planar surface so that orientation of the object during movement is not critical. That is, the object can be rolled along the ground in any one of a number of dispositions. Moreover, an object may be entirely wrapped with a flexible sheet having casters in accordance with the invention so that it can be placed on the ground in any orientation and rolled therealong.

It is to be appreciated that variations of the aforementioned preferred embodiments may be made without the departing from the spirit and scope of the invention which is set forth in the following claims.

What is claimed is:

1. Apparatus for moving heavy objects comprising
a base web of sheet-like material flexible enough to be wound in and dispensed from a spool and to conform to irregular surfaces about which it is wound, said base web having a plurality of apertures,
caster means mounted on said base web at each of said apertures, said caster means comprising a housing having a cavity and a ball snugly disposed within said cavity, said ball being freely rotatable within said cavity but restricted from translational movement, a portion of the circumference of each of said balls protruding through a respective one of said base web apertures from one surface of said base web.

2. Apparatus for moving heavy objects according to claim 1 further comprising a retainer means mounted on said housing, over each ball, said retainer means having an aperture with a diameter less than the maximum diameter of said ball for keeping said ball within said housing, a portion of the circumference of said ball protruding through said retainer means aperture.

3. Apparatus for moving heavy objects according to claim 2 wherein said retainer means is fastened to said base web of flexible material.

4. Apparatus for moving heavy objects according to claim 1 wherein the apertures in said base web are blind apertures in the form of cavities, said housing being integral with said base web, and further comprising retainer means mounted on said base web, over each of said balls, said retainer means having apertures in one to one correspondence and in alignment with said cavities, each retainer means aperture having a diameter less than the maximum diameter of its respective ball for keeping said ball within said base web, a portion of the circumference of said ball protruding through said retainer means aperture.

5. Apparatus for moving heavy objects according to claim 4 wherein said retainer means comprises a flexible retainer web having dimensions coextensive with said base web.

6. Apparatus for moving heavy objects according to claim 5 wherein the thickness of said retainer web is less than the thickness of said base web.

7. Apparatus for moving heavy objects according to claim 1 wherein the apertures in said base web are blind apertures in the form of cavities in one surface of said base web, and there is one of said caster means embedded within each cavity of said base web except for a portion of the circumference of said ball protruding beyond said one base web surface.

8. Apparatus for moving heavy objects according to claim 1 wherein there is a channel formed within said base web, said channel being open at one surface of said base web, said channel containing a plurality of said balls, a portion of the circumference of each of said balls protruding through said base web opening, the width of said opening at said surface being less than the diameters of said balls for keeping said balls within the channel.

* * * * *